(12) United States Patent
Celli et al.

(10) Patent No.: US 8,230,222 B2
(45) Date of Patent: Jul. 24, 2012

(54) METHOD, SYSTEM AND COMPUTER PROGRAM FOR DEPLOYING SOFTWARE PACKAGES WITH INCREASED SECURITY

(75) Inventors: Massimiliano Celli, Latina SNC (IT); Luca Ferri, Rome (IT); Luigi Pichetti, Rome (IT); Marco Secchi, Rome (IT); Marcello Velati, Rome (IT)

(73) Assignee: International Business Machines Corporation, Armonk, NY (US)

( * ) Notice: Subject to any disclaimer, the term of this patent is extended or adjusted under 35 U.S.C. 154(b) by 1007 days.

(21) Appl. No.: 11/465,824

(22) Filed: Aug. 21, 2006

(65) Prior Publication Data

US 2007/0047735 A1 Mar. 1, 2007

(30) Foreign Application Priority Data

Aug. 23, 2005 (EP) .................................. 05107727

(51) Int. Cl.
*H04L 29/00* (2006.01)
(52) U.S. Cl. .................. 713/173; 713/171; 380/286
(58) Field of Classification Search .................. None
See application file for complete search history.

(56) References Cited

U.S. PATENT DOCUMENTS

| | | | | |
|---|---|---|---|---|
| 5,343,527 A | * | 8/1994 | Moore | 713/179 |
| 7,127,069 B2 | * | 10/2006 | Nguyen | 380/278 |
| 7,522,732 B2 | * | 4/2009 | Whitehead | 380/286 |
| 2003/0021416 A1 | * | 1/2003 | Brown et al. | 380/277 |
| 2003/0074413 A1 | * | 4/2003 | Nielsen et al. | 709/206 |
| 2006/0018478 A1 | * | 1/2006 | Diefenderfer et al. | 380/259 |

OTHER PUBLICATIONS

U.S. Appl. No. 60/651,039, "Securing the SIP EMTA configuration file", Negahdar, file date Feb. 7, 2005.*

* cited by examiner

*Primary Examiner* — Vivek Srivastava
*Assistant Examiner* — Helai Salehi
(74) *Attorney, Agent, or Firm* — Garg Law Firm, PLLC; Rakesh Garg; Jeffrey S. LaBaw

(57) ABSTRACT

A software distribution method (300) with security add-on is proposed. Particularly, any software package to be deployed to selected target endpoints is encrypted (312-315) with a symmetric key (generated dynamically). The symmetric key is in turn encrypted (318-321) with a public key of each target endpoint. A multi-segment software package (embedding the encrypted software package and the encrypted symmetric keys) is then deployed (324-336, 360) to all the target endpoints. In this way, each target endpoint can decrypt (343-348) the encrypted symmetric key with a corresponding private key; it is then possible to decrypt (363-366) the encrypted software package with the symmetric key so obtained. As a result, the endpoint is able to apply (369) the decrypted software package. Therefore, the application of the software package can be restricted to the desired target endpoints only.

15 Claims, 5 Drawing Sheets

METHOD, SYSTEM AND COMPUTER PROGRAM FOR DEPLOYING SOFTWARE PACKAGES WITH INCREASED SECURITY

FIELD OF THE INVENTION

The present invention relates to the data processing field. More specifically, the present invention relates to the deployment of software packages in a data processing system.

BACKGROUND ART

Installation, removal or update of software products is a very time consuming activity, especially in a data processing system including a great number of computers (or endpoints). A typical example is that of a large network with hundreds of workstations, wherein software products are periodically upgraded in order to be abreast of the information technology development.

Software distribution applications have been proposed in the last years to assist a system administrator in efficiently managing the deployment of software products from a central site of the system; an example of software distribution application is the "IBM Tivoli Configuration Manager or ITCM" by IBM Corporation. Typically, a software distribution application controls the building of software packages including commands that specify the actions to be carried out on the endpoints for enforcing the desired configuration; each software package can further embed an image of the software products to be installed on the endpoints. The software package is distributed to selected target endpoints, and it is then applied by executing the corresponding commands.

A drawback of the solutions known in the art is that whoever manages to log in the software distribution application can start the deployment of any software package. This may cause problems when an intruder has accessed the system fraudulently, or even when an error is performed unintentionally. For example, it is possible to deploy software packages infected by harmful code (such as viruses, worms, trojans, and the like). This kind of attacks may have detrimental effects on the system; particularly, the harmful code can adversely affect operation of the endpoints (down to a complete stop of the whole system), or it can be exploited to access confidential information. The problem is particular acute in environments having strict security requirements (such as government, military or financial organizations).

Moreover, no mechanism is available in the software distribution applications known in the art for managing the confidentiality of the information that is deployed. Particularly, there is not the possibility of restricting the access to any distributed software package. Indeed, whatever endpoint receiving the software package (either fraudulently or by mistake) is able to apply it; therefore, the available solutions are unable to ensure that the software package is applied on the desired target endpoints only.

SUMMARY OF THE INVENTION

According to the present invention, a security add-on is proposed.

Particularly, an aspect of the invention proposes a method for deploying software packages (adapted to enforce software configurations) in a data processing system. The system includes a plurality of target entities (or endpoints); each target entity is associated with a corresponding pair of private key and public key. The method starts with the step of providing a software package to be deployed to a set of selected target entities. A symmetric key is associated with the software package. The software package (or a portion thereof) is then encrypted with this symmetric key. For each selected target entity, the method continues encrypting the symmetric key with the corresponding public key. The encrypted software package and the encrypted symmetric keys are then deployed to the selected target entities. This enables each selected target entity to decrypt the corresponding encrypted symmetric key with the associated private key. The encrypted software package is then decrypted with the decrypted symmetric key. At the end, the decrypted software package is applied, in order to enforce the corresponding software configuration.

In a preferred embodiment of the invention, all the encrypted symmetric keys are distributed to each target endpoint.

A way to further improve the solution is of using a service software package for this purpose.

Advantageously, for each target endpoint the service software package includes a stanza with decryption actions (for decrypting the corresponding encrypted symmetric key with the associated private key) conditioned to an identification of the target endpoint.

A suggested technique for deploying the encrypted software package and the service software package is based on the use of a multi-segment software package.

As a further enhancement, the encrypted software package is downloaded only in response to a successful decryption of the symmetric key.

In a specific implementation, the decrypted symmetric key is stored (on the target endpoint) and it is then retrieved after downloading the encrypted software package.

Preferably, only a data section of the software package is encrypted.

A further aspect of the present invention proposes a computer program for performing the above-described method.

Moreover, another aspect of the present invention proposes a corresponding system.

The characterizing features of the present invention are set forth in the appended claims. The invention itself, however, as well as further features and the advantages thereof will be best understood by reference to the following detailed description, given purely by way of a nonrestrictive indication, to be read in conjunction with the accompanying drawings.

DETAILED DESCRIPTION

Figure 1A:
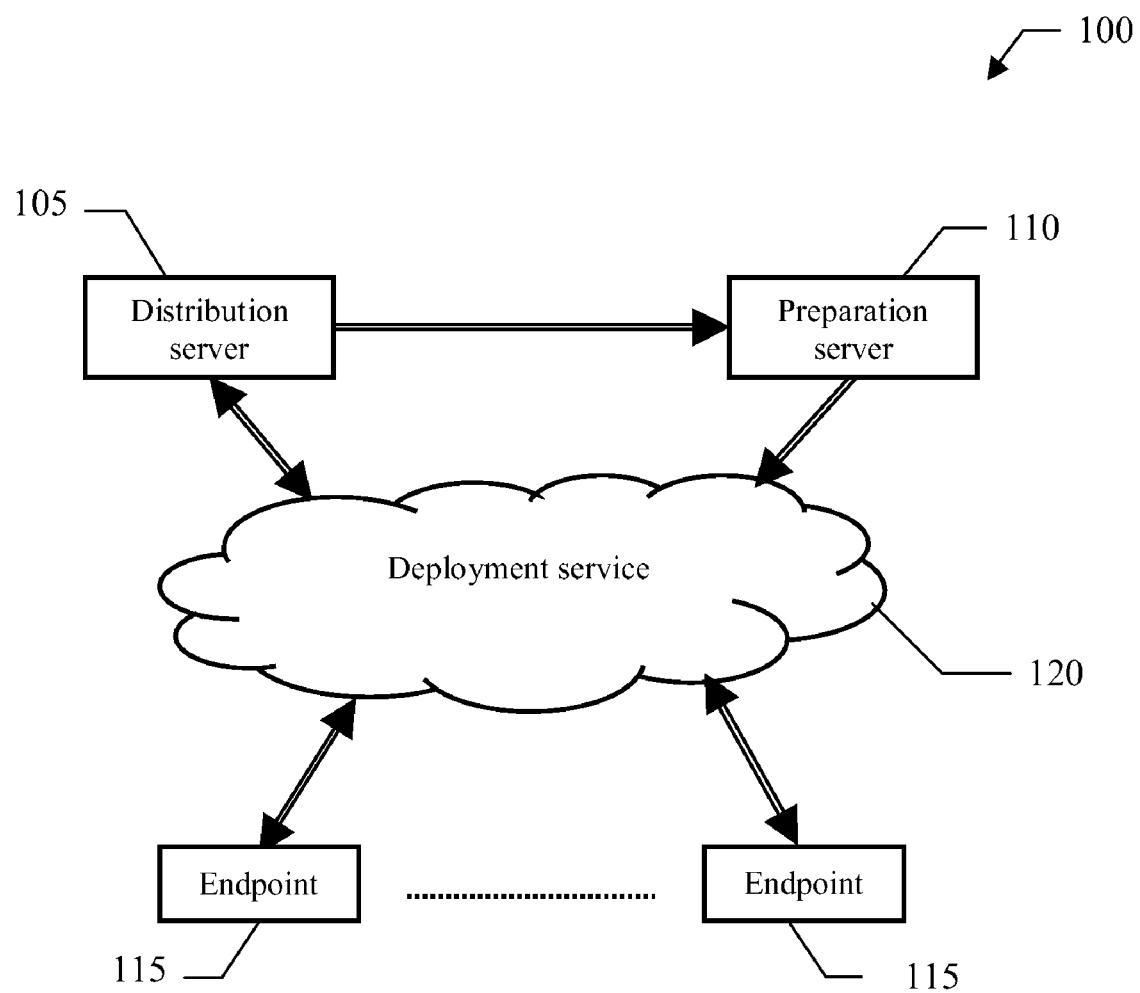
FIG. 1a is a schematic block diagram of a data processing system in which the solution according to an embodiment of the invention is applicable.

With reference in particular to FIG. 1a, a data processing system 100 with distributed architecture is illustrated. The system 100 implements a software distribution infrastructure (for example, based on the above-mentioned ITCM). Particularly, the server side of the system 100 consists of a distribution server 105 and a preparation server 110.

The preparation server 110 operates as a central site for defining and testing software packages to be used for deploying software products, such as application programs (as described in detail in the following); moreover, the preparation server 110 also acts as a source host providing the required software packages during an actual deployment process. The distribution server 105 coordinates the deployment of the software packages from the preparation server 110. The client side of the system 100 instead consists of multiple endpoints 115, to which the software packages must be deployed. For this purpose, the distribution server 105, the preparation server 110, and the endpoints 115 exploit a deployment service 120. For example, the deployment service 120 consists of the "Multiplexed Distribution or MDIST2" service based on the "Tivoli Management Framework or TMF" by IBM Corporation; typically, the deployment service 120 is implemented by one or more levels of gateways, which act as depots (or repeaters) for the information to be deployed.

Figure 1B:
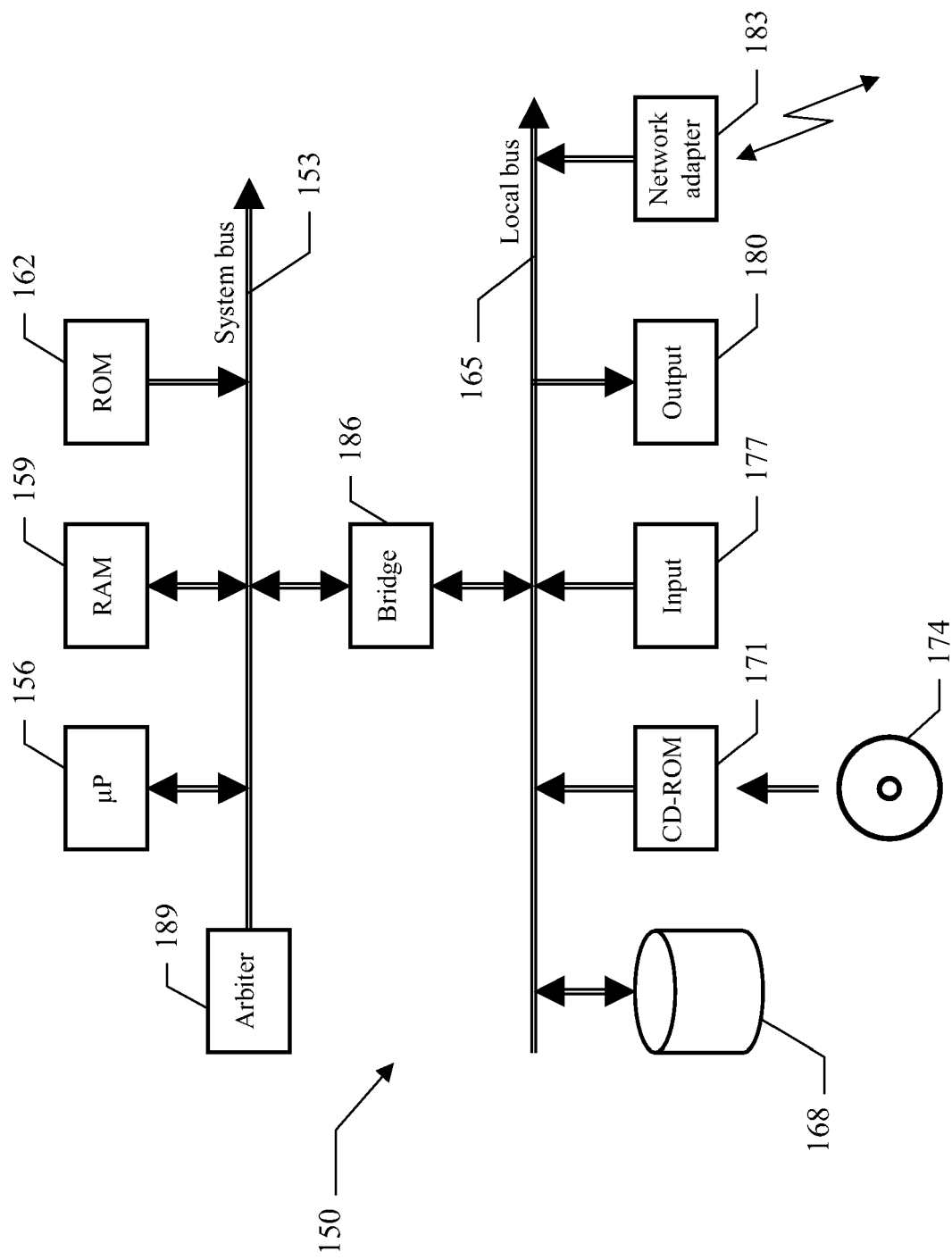
FIG. 1b shows the functional blocks of an exemplary computer of the system.

As shown in FIG. 1b, a generic computer of the system (distribution server, preparation server, and endpoint) is denoted with 150. The computer 150 is formed by several units that are connected in parallel to a system bus 153. In detail, one or more microprocessors (μP) 156 control operation of the computer 150; a RAM 159 is directly used as a working memory by the microprocessors 156, and a ROM 162 stores basic code for a bootstrap of the computer 150. Peripheral units are clustered around a local bus 165 (by means of respective interfaces). Particularly, a mass memory consists of a hard-disk 168 and a drive 171 for reading CD-ROMs 174. Moreover, the computer 150 includes input devices 177 (for example, a keyboard and a mouse), and output devices 180 (for example, a monitor and a printer). An adapter 183 is used to connect the computer 150 to a network. A bridge unit 186 interfaces the system bus 153 with the local bus 165. Each microprocessor 156 and the bridge unit 186 can operate as master agents requesting an access to the system bus 153 for transmitting information. An arbiter 189 manages the granting of the access with mutual exclusion to the system bus 153.

Figure 2:
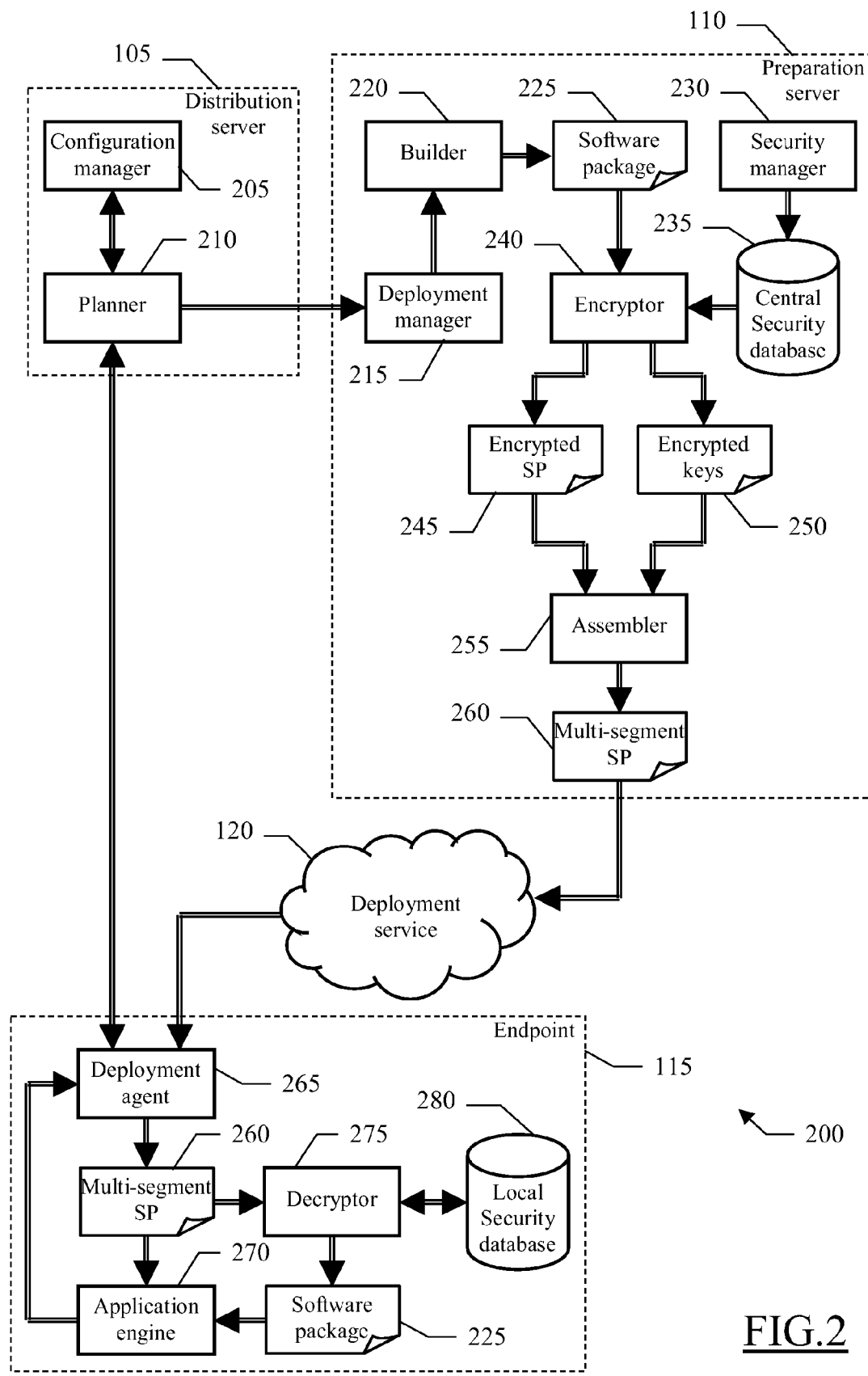
FIG. 2 depicts the main software components that can be used for implementing the solution according to an embodiment of the invention.

Considering now FIG. 2, the main software components that run on the above-described system are denoted as a whole with the reference 200. The information (programs and data) is typically stored on the hard-disk and loaded (at least partially) into the working memory of each computer when the programs are running, together with an operating system and other application programs (not shown in the figure). The programs are initially installed onto the hard disk, for example, from CD-ROM.

With reference in particular to the distribution server 105, a configuration manager 205 (such as the "Change Manager or CM" service of the above-mentioned ITCM) controls the generation of distribution plans for enforcing desired software configurations of selected target endpoints; for example, the operation may be performed according to predefined reference models (defining the software configuration of subscribing endpoints identified by their role), or in response to specific requests entered through a command line interface (CLI). Each distribution plan consists of a list of activities to be executed on the target endpoints (possibly conditioned to each other). Typically, an activity of the configuration type causes the application of a software package on the target endpoints; for example, the activity is specified by a desired state of the software package (such as installed and committed, installed in an undoable manner, or removed). On the other hand, an activity of the inventory type triggers the execution of a scanning operation on the target endpoints (for example, for detecting their current software configuration).

The distribution plans so obtained are submitted by the configuration manager 205 to a planner 210 (such as the "Activity Planner Manager or APM" service of the above-mentioned ITCM). The planner 210 controls the execution of the desired activities on the target endpoints.

For this purpose, the planner 210 interfaces with a deployment manager 215 running on the preparation server 110. Particularly, the planner 210 causes the deployment manager 215 to make available the required software packages. In response thereto, the deployment manager 215 requests a builder 220 to retrieve or to dynamically generate each one of those software packages (denoted with 225).

Generally, a software package (also known as software package block) includes an instruction section that defines commands (possibly conditioned to run-time parameters) to be executed on the target endpoints for enforcing the desired software configuration (such as installing, removing or updating a corresponding software product); moreover, the software package includes a data section that contains an image of any required resources (such as executable modules, configuration files, databases, icons, and the like). The software package may also be of the multi-segment (or nested) type. More in detail, this structure includes multiple segments, each one consisting of a (basic) software package; the whole multi-segment software package is processed as a single entity (with its segments that are downloaded automatically in succession onto the target endpoints, as described in detail in the following). The software packages embedded in the multi-segment software package are listed in a corresponding Table of Content (TOC). The above-described functionality is usually exploited to deploy a (main) software package together with any prerequisite software packages that are required for its application.

For each software package 225 so obtained, a security manager 230 generates a corresponding symmetric key dynamically. This key defines a shared secret, which can be used in a symmetric encryption technique both to encrypt a message (i.e., to transform the message into an apparently unintelligible form) and to decrypt the encrypted message in order to restore its original form. The symmetric key and a label of the corresponding software package 225 are stored into a protected central security database 235.

The security database 235 also stores a public key of each endpoint of the system. Particularly, each endpoint is associated with a pair of public/private keys. The public key is a non-confidential piece of information and the private key is a confidential piece of information that are used in an asymmetric encryption technique. One of the keys (either the public one or the private one) can be used to encrypt an original message, while the other key is used to decrypt it. The keys are generated so that it is computationally unfeasible to obtain the private key from the public key.

Each software package 225 to be deployed to the desired target endpoints is supplied to an encryptor 240. The encryptor 240 extracts the corresponding symmetric key from the central security database 235, and encrypts the data section of the software package 225 by using this symmetric key (thereby limiting the operation to the actual information to be protected). At the same time, the encryptor 240 also extracts the public key of each target endpoint from the central security database 235, and encrypts the symmetric key with each one of those public keys.

The resulting encrypted software package (denoted with 245) and encrypted symmetric keys (denoted with 250), each one associated with an identifier of the corresponding target endpoint, are input to an assembler 255. The assembler 255 builds a service software package, which includes (in its instruction section) a list of commands for decrypting the encrypted symmetric keys (with the data section that is empty); each one of those commands is conditioned to the identifier of the corresponding target endpoint. For example, the instruction section is based on an SP stanza representing the above mentioned decryption actions. In this way, the desired commands are automatically associated with the respective target endpoints in a very simple way. The assembler 255 then builds a multi-segment software package 260; particularly, the multi-segment software package 260 embeds the encrypted software package 245 (in a first segment) and the service software package (in a second segment).

The multi-segment software package 260 is now uploaded to a depot of the deployment service 120 associated with the preparation server 110; this depot in turn distributes the multi-segment software package to further depots associated with the target endpoints. As a result, a single structure may be used to deploy the encrypted software package with the information required for its decryption to all the target endpoints (without requiring any individual operation for the different target endpoints). Particularly, this result is achieved exploiting the same technology used to deploy the actual software package. More specifically, the idea of deploying both the encrypted software package and the encrypted symmetric keys with a single multi-segment software package strongly simplifies the process.

Each endpoint 115 (only one shown in the figure) includes a deployment agent 265, which periodically verifies the availability of any software package on its depot of the deployment service 120, and then downloads it. The deployment agent 265 also receives instructions directly from the planner 210 (on the distribution server 105) for enforcing any inventory activity. The downloaded software package (in the example at issue consisting of the multi-segment software package 260) is supplied to an application engine 270 (such as the "Software Installation Engine or SIE" service of the above-mentioned ITCM), which enforces its application on the endpoint 115. In this case, the endpoint 115 at first downloads the service software package in the last segment of the multi-segment software package 260. The application engine 270 then executes the command in the service software package that is conditioned to its identifier. As a result, the application engine 270 instructs a decryptor 275 to decrypt the corresponding encrypted symmetric key with the private key of the endpoint 115, which private key is available in a protected local security database 280; the decrypted symmetric key so obtained is saved into the same local security database 280. The endpoint 115 then downloads the encrypted software package in the other segment of the multi-segment software package 260. The application engine 270 now instructs the decryptor 275 to extract the (decrypted) symmetric key from the local security database 280, and to decrypt the data section of the encrypted software package by using this symmetric key. The resulting (decrypted) software package 225 is then passed to the engine 270, which controls its application on the endpoint 115. The application engine 270 returns the result of the application of the software package 225 to the deployment agent 265, which in turn forwards it to the planner 210 (in order to allow the configuration manager 205 to update corresponding information about the endpoint 115).

The above-described implementation is based (with some modifications) on the structure proposed in WO-A-003085513, the entire disclosure of which is herein incorporated by reference.

Figure 3A:
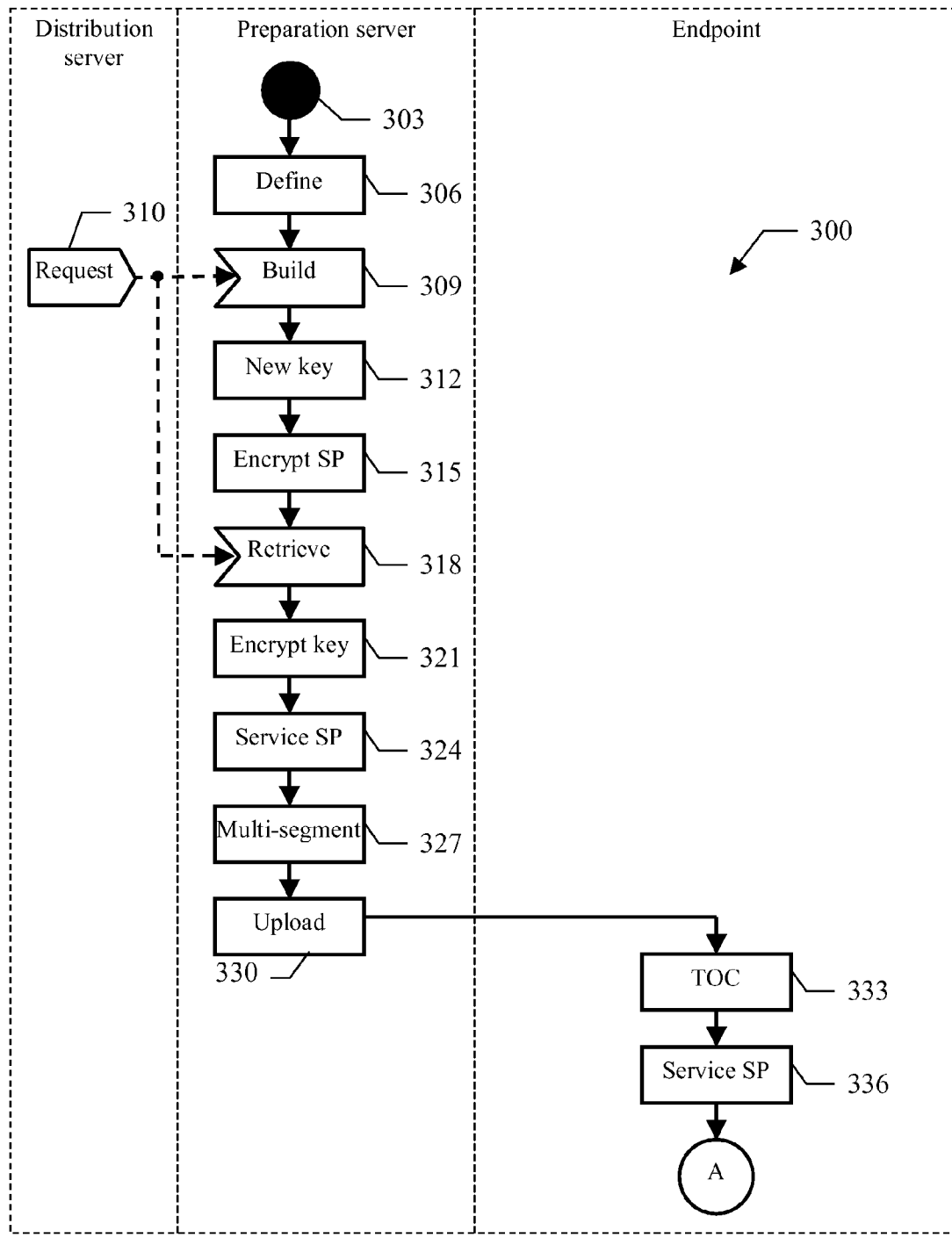
FIGS. 3a-3b show a diagram describing the flow of activities relating to an implementation of the solution according to an embodiment of the invention.
Figure 3B:
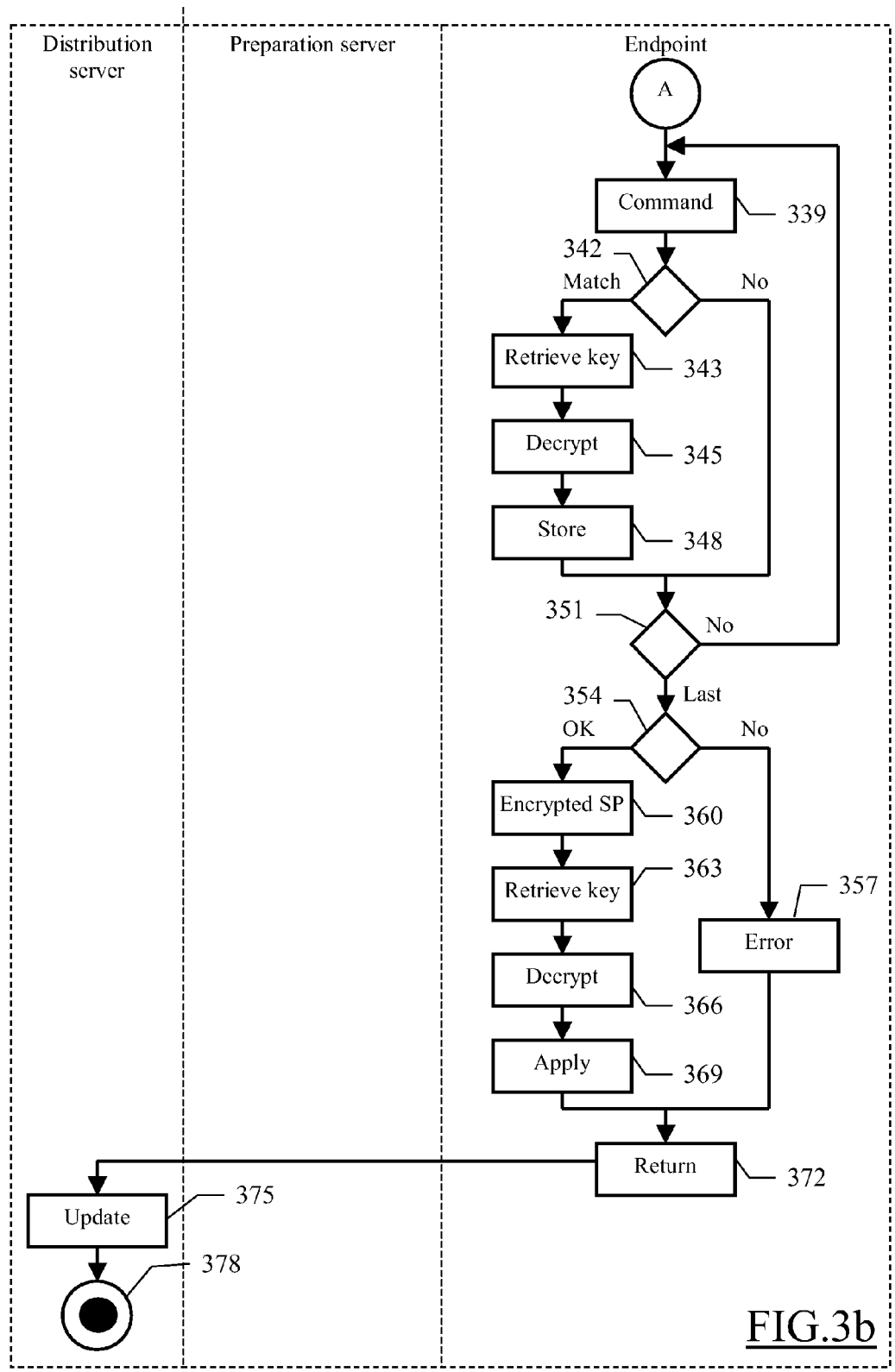

Moving now to FIGS. 3a-3b, the logic flow of an exemplary process that can be implemented in the above-described system (for deploying a specific software package to authorized target endpoints only) is represented with a method 300. The method 300 begins at the black start circle 303 in the swim-lane of the preparation server. Passing to block 306, a generic software package to be deployed is defined (by specifying the corresponding instruction section and providing any associated resource images). The actual software package is then built at block 309; this operation may be performed either statically as soon the software package is defined, so that the resource images are frozen for all the endpoints, or dynamically in response to a request from the distribution server (block 310), so that different endpoints always receive the latest version of each resource image.

In any case, the flow of activity continues to block 312, wherein a corresponding symmetric key is generated and stored into the central security database. Proceeding to block 315, the software package is encrypted with its symmetric key (being extracted from the central security database). The block 318 is now entered; the same point may also be reached from block 310 in response to the request from the distribution server, when the software package was build statically. In this phase, the symmetric key of the software package and the public key of each target endpoint (to which the software package must be deployed) are retrieved from the central security database. Considering now block 321, the symmetric key is encrypted with each one of those public keys. Passing to block 324, the assembler builds a service software package with the list of commands for decrypting the encrypted symmetric keys (each one conditioned to the identifier of the corresponding target endpoint). The assembler then embeds the encrypted software package and the service software package into a multi-segment software package (block 327).

The process continues to block 330, wherein the multi-segment software package is uploaded to the depot of the deployment service associated with the preparation server; at the same time, an identification code is returned to the distribution server (to enable monitoring and controlling the deployment process). The multi-segment software package is distributed across the hierarchy of depots, until the ones associated with the target endpoints are reached. Once the multi-segment software package has been uploaded on the depot of a generic target endpoint, this depot accordingly notifies the target endpoint (by means of a label identifying the multi-segment software package).

In response thereto, the deployment agent of this target endpoint at block 333 opens a communication channel to the associated depot and downloads the TOC of the multi-segment software package. Passing to block 336, the deployment agent in turns downloads the last segment of the multi-segment software package as indicated in the TOC (i.e., the service software package). A loop is then performed for applying this service software package; the loop begins at block 339, wherein a current command of its instruction section (starting from the first one) is interpreted. If the application engine at block 342 verifies that the condition associated with the command is satisfied (i.e., the corresponding identifier matches the one of the target endpoint), the command is executed. Particularly, the decryptor at block 343 retrieves the private key of the target endpoint from the local security database. Continuing to block 345, this private key is used to decrypt the encrypted symmetric key specified in the command. The (decrypted) symmetric key so obtained is saved into the same local security database at block 348. The process then descends into block 351; the same point is also reached from block 342 directly when the condition associated with the command is not satisfied (since the corresponding decrypted symmetric key is intended for another target endpoint). Considering now block 351, a test is made to verify whether all the commands of the service software package have been processed. If not, the flow of activity returns to block 339 to reiterate the same operations for a next command.

Conversely, the loop is exit and the process descends into decision block 354. The process then branches according to the result of the application of the service software package. Particularly, if the application was unsuccessful the block 357 is executed, whereas if the application was successful the blocks 360-369 are executed; in both cases, the flow of activity then merges at block 372.

With reference in particular to block 357 (unsuccessful application), an error condition is entered; this occurs when the endpoint is not a target of the deployment process (so that no command addressed to it is included in the service software package). In this way, it is possible to prevent the execution of unnecessary operations (i.e., the downloading of the encrypted software package). It should also be noted that any other endpoint is unable to decrypt the symmetric key correctly (because none of the required private keys is available).

Considering instead block 360 (successful application), the deployment agent downloads the other segment of the multi-segment software package as indicated in the TOC (i.e., the encrypted software package). A command of the encrypted software package (available in clear in its instruction section) causes the decryptor to extract the corresponding symmetric key from the local security database at block 363. Continuing to block 366, another command instructs the same module to decrypt the encrypted software package by using this symmetric key. The instruction section of the encrypted software package then includes further commands for enforcing the actual application of the (decrypted) software package so obtained (block 369).

Moving now to block 372, feedback information (i.e., an error code or a return code of the real application of the software package) is returned to the distribution server. In response thereto, the configuration manager at block 375 accordingly updates the corresponding configuration information for the target endpoint. The method then ends at the concentric black/white stop circles 378.

The above-described solution strongly improves the security of the deployment process. Particularly, the devised mechanism allows restricting the access to any distributed software package. In this way, it is possible to ensure that the software package is applied on the desired target endpoints only; indeed, any other endpoint receiving the software package (either fraudulently or by mistake) cannot decrypt it so as to restore the original form thereof required for its application.

It should be noted that this result is achieved by using the same encrypted software package for all the target endpoints. Conversely, only a very small piece of information (i.e., the symmetric key) must be encrypted individually with the different public keys of the target endpoints.

Naturally, in order to satisfy local and specific requirements, a person skilled in the art may apply to the solution described above many modifications and alterations. Particularly, although the present invention has been described with a certain degree of particularity with reference to preferred embodiment(s) thereof, it should be understood that various omissions, substitutions and changes in the form and details as well as other embodiments are possible; moreover, it is expressly intended that specific elements and/or method steps described in connection with any disclosed embodiment of the invention may be incorporated in any other embodiment as a general matter of design choice.

For example, similar considerations apply if the system has a different architecture or includes equivalent units. Moreover, each computer may have another structure or may include similar elements (such as cache memories temporarily storing the program or a part thereof to reduce the accesses to the mass memory during execution); in any case, it is possible to replace the computer with any code execution entity (such as a PDA, a mobile phone, and the like).

Likewise, the use of any other infrastructure is within the scope of the invention; for example, it is possible to use a different software distribution application, to collapse the distribution server and the preparation server into a single computer, and the like. Moreover, the software package may have another structure, or it may be used to deploy equivalent software products (such as patches, audio files, multimedia works) or more generally to enforce any desired software configuration.

Alternatively, the service software package may include a different structure for instructing each target endpoint to decrypt the corresponding encrypted symmetric key (for example, a single command receiving a run-time parameter based on the identifier of the current target endpoint for selecting the correct encrypted symmetric key to be processed).

In any case, a simplified implementation wherein each encrypted symmetric key is distributed individually to the corresponding target endpoint is not excluded (even if it is far less advantageous).

Without departing from the principles of the invention, it is also possible to deploy the encrypted symmetric keys with other techniques (for example, by adding the corresponding commands to the instruction section of the encrypted software package).

Similar considerations apply when the software package itself is of the nested type (with the multi-segment software package then consisting of more than two segments). However, nothing prevents the deployment of the encrypted software package and of the service software package independently (so as to further increase the security but at the cost of a more complex implementation).

It should be apparent that the invention has equal application to a deployment service that downloads the whole multi-segment software package on each target endpoint (without the possibility of implementing any conditioning schema).

Alternatively, only some selected resource images of the software package are encrypted, or conversely the process is applied to the whole software package (i.e., to both its instruction section and data section).

Similar considerations apply if the program (which may be used to implement the invention) is structured in a different way, or if additional modules or functions are provided; likewise, the memory structures may be of other types, or may be replaced with equivalent entities (not necessarily consisting of physical storage media). Moreover, the proposed solution lends itself to be implemented with an equivalent method (having similar or additional steps, even in a different order). In any case, the program may take any form suitable to be used by or in connection with any data processing system, such as external or resident software, firmware, or microcode (either in object code or in source code). Moreover, the program may be provided on any computer-usable medium; the medium can be any element suitable to contain, store, communicate, propagate, or transfer the program. Examples of such medium are fixed disks (where the program can be pre-loaded), removable disks, tapes, cards, wires, fibers, wireless connections, networks, broadcast waves, and the like; for example, the medium may be of the electronic, magnetic, optical, electromagnetic, infrared, or semiconductor type.

Even though in the preceding description reference has been made to a specific service that is deployed by a corresponding provider, this is not to be intended as a limitation (with the execution of the same process that can be controlled by any other entity).

In any case, the solution according to the present invention lends itself to be carried out with a hardware structure (for example, integrated in a chip of semiconductor material), or with a combination of software and hardware.

The invention claimed is:

1. A method for deploying software packages adapted to enforce software configurations in a data processing system including a plurality of target entities, each target entity being associated with a corresponding pair of private key and public key, wherein the method includes the steps of:
   providing, from a server computer over a data network, a software package to be deployed to a set of selected target entities, each of the selected target entities being an endpoint computer;
   associating a symmetric key with the software package;
   encrypting at least a portion of the software package with the symmetric key; for each selected target entity encrypting the symmetric key with the corresponding public key of the selected target entity;
   building a further software package, the further software package including a plurality of encrypted symmetric keys, each encrypted symmetric key in the plurality of encrypted keys being associated with an indication of a corresponding selected target entity; and
   deploying the encrypted software package and the further software package to the selected target entities to enable each selected target entity to decrypt the corresponding encrypted symmetric key with the associated private key, to decrypt the encrypted software package with the decrypted symmetric key, and to apply the decrypted software package for enforcing the corresponding software configuration, wherein for each selected target entity the further software package includes a command for decrypting the corresponding encrypted symmetric key with the associated private key, the command being conditioned to an identification of the selected target entity using run-time parameters of the selected target entity for enforcing a software configuration from the software configurations on the selected target entity.

2. The method according to claim 1, wherein the step of deploying the encrypted software package and the further software package further includes:
   building a multi-segment software package including the further software package and the encrypted software package; and
   distributing the multi-segment software package to each selected target entity.

3. The method according to claim from 1, wherein the software package includes an instruction section and a data section, the at least a portion of the software package consisting of the data section.

4. The method according to claim 2, wherein for each selected target entity the step of distributing the multi-segment software package includes:
   downloading the further software package; and downloading the encrypted software package in response to a successful decryption of the corresponding encrypted symmetric key with the associated private key.

5. The method according to claim 4, further including the steps for each selected target entity of:
   storing the decrypted symmetric key before downloading the encrypted software package; and
   retrieving the decrypted symmetric key after downloading the encrypted software package.

6. A computer program product including a computer-usable storage device embodying a computer program, the computer program when executed on a data processing system causing the system to perform a method for deploying software packages adapted to enforce software configurations in the system, the system including a plurality of target entities each one being associated with a corresponding pair of private key and public key, wherein the method includes the steps of:
   providing, from a server computer over a data network, a software package to be deployed to a set of selected target entities, each of the selected target entities being an endpoint computer;
   associating a symmetric key with the software package;
   encrypting at least a portion of the software package with the symmetric key; for each selected target entity encrypting the symmetric key with the corresponding public key of the selected target entity;
   building a further software package, the further software package including a plurality of encrypted symmetric keys, each encrypted symmetric key in the plurality of encrypted keys being associated with an indication of a corresponding selected target entity; and
   deploying the encrypted software package and the further software package to the selected target entities to enable each selected target entity to decrypt the corresponding encrypted symmetric key with the associated private key, to decrypt the encrypted software package with the decrypted symmetric key, and to apply the decrypted software package for enforcing the corresponding software configuration, wherein for each selected target entity the further software package includes a command for decrypting the corresponding encrypted symmetric key with the associated private key, the command being conditioned to an identification of the selected target entity using run-time parameters of the selected target entity for enforcing a software configuration from the software configurations on the selected target entity.

7. The computer program product according to claim 6, wherein the step of deploying the encrypted software package and the further software package further includes:
   building a multi-segment software package including the further software package and the encrypted software package; and
   distributing the multi-segment software package to each selected target entity.

8. The computer program product according to claim from 6, wherein the software package includes an instruction section and a data section, the at least a portion of the software package consisting of the data section.

9. The computer program product according to claim 7, wherein for each selected target entity the step of distributing the multi-segment software package includes:
   downloading the further software package; and
   downloading the encrypted software package in response to a successful decryption of the corresponding encrypted symmetric key with the associated private key.

10. The computer program product according to claim 9, further including the steps for each selected target entity of:

storing the decrypted symmetric key before downloading the encrypted software package; and retrieving the decrypted symmetric key after downloading the encrypted software package.

11. A system for deploying software packages adapted to enforce software configurations in a data processing system including a plurality of target entities, each target entity being associated with a corresponding pair of private key and public key, wherein the system includes:

a storage device including a storage medium, wherein the storage device stores computer usable program code; and a processor, wherein the processor executes the computer usable program code, and wherein the computer usable program code comprises:

computer usable code for providing, from a server computer over a data network, a software package to be deployed to a set of selected target entities, each of the selected target entities being an endpoint computer;

computer usable code for associating a symmetric key with the software package;

computer usable code for encrypting at least a portion of the software package with the symmetric key;

computer usable code for encrypting the symmetric key with the corresponding public key for each selected target entity;

computer usable code for building a further software package, the further software package including a plurality of encrypted symmetric keys, each encrypted symmetric key in the plurality of encrypted keys being associated with an indication of a corresponding selected target entity; and computer usable code for deploying the encrypted software package and the further software package to enable each selected target entity to decrypt the corresponding encrypted symmetric key with the associated private key, to decrypt the encrypted software package with the decrypted symmetric key, and to apply the decrypted software package for enforcing the corresponding software configuration, wherein for each selected target entity the further software package includes a command for decrypting the corresponding encrypted symmetric key with the associated private key, the command being conditioned to an identification of the selected target entity using run-time parameters of the selected target entity for enforcing a software configuration from the software configurations on the selected target entity.

12. The system according to claim 11, wherein the step of deploying the encrypted software package and the further software package further includes:

computer usable code for building a multi-segment software package including the further software package and the encrypted software package; and computer usable code for distributing the multi-segment software package to each selected target entity.

13. The system according to claim from 11, wherein the software package includes an instruction section and a data section, the at least a portion of the software package consisting of the data section.

14. The system according to claim 12, wherein for each selected target entity the step of distributing the multi-segment software package includes:

computer usable code for downloading the further software package; and computer usable code for downloading the encrypted software package in response to a successful decryption of the corresponding encrypted symmetric key with the associated private key.

15. The system according to claim 14, further including the steps for each selected target entity of:

computer usable code for storing the decrypted symmetric key before downloading the encrypted software package; and computer usable code for retrieving the decrypted symmetric key after downloading the encrypted software package.

* * * * *